United States Patent
Emmett et al.

(10) Patent No.: US 9,443,091 B2
(45) Date of Patent: Sep. 13, 2016

(54) METHOD AND SYSTEM FOR PROTECTING EXECUTION OF CRYPTOGRAPHIC HASH FUNCTIONS

(75) Inventors: Jonathan Emmett, Almonte (CA); Philip Allan Eisen, Ottawa (CA); James Muir, Kanata (CA); Daniel Murdock, Nepean (CA)

(73) Assignee: Irdeto B.V., Hoofddorp (NL)

( * ) Notice: Subject to any disclaimer, the term of this patent is extended or adjusted under 35 U.S.C. 154(b) by 152 days.

(21) Appl. No.: 14/008,359

(22) PCT Filed: Mar. 31, 2011

(86) PCT No.: PCT/CA2011/050172
§ 371 (c)(1),
(2), (4) Date: Sep. 27, 2013

(87) PCT Pub. No.: WO2012/129638
PCT Pub. Date: Oct. 4, 2012

(65) Prior Publication Data
US 2014/0019771 A1    Jan. 16, 2014

(51) Int. Cl.
*G06F 21/60* (2013.01)
*G06F 21/10* (2013.01)
*H04L 9/00* (2006.01)
(Continued)

(52) U.S. Cl.
CPC ............ *G06F 21/602* (2013.01); *G06F 7/764* (2013.01); *G06F 21/10* (2013.01); *H04L 9/002* (2013.01); *H04L 9/0643* (2013.01); *H04L 2209/16* (2013.01)

(58) Field of Classification Search
CPC .. H04L 9/0643; H04L 2209/16; G06F 7/764
USPC ........................................................ 713/189
See application file for complete search history.

(56) References Cited

U.S. PATENT DOCUMENTS

| | | | | |
|---|---|---|---|---|
| 2001/0046307 A1* | 11/2001 | Wong | ................... | G06T 1/0035 382/100 |
| 2003/0105718 A1* | 6/2003 | Hurtado | .................. | G06F 21/10 705/51 |
| 2008/0028474 A1* | 1/2008 | Horne | ..................... | G06F 21/16 726/27 |

(Continued)

FOREIGN PATENT DOCUMENTS

| | | |
|---|---|---|
| EP | 0848518 A2 | 12/1997 |
| JP | H10-171350 A | 6/1998 |

(Continued)

OTHER PUBLICATIONS

International Search Report and Written Opinion dated Nov. 30, 2011.

(Continued)

*Primary Examiner* — Ellen Tran
(74) *Attorney, Agent, or Firm* — Marc S. Kaufman; Reed Smith LLP

(57) ABSTRACT

A method of protecting the execution of a cryptographic hash function, such as SHA-256, in a computing environment where inputs, outputs and intermediate values can be observed. The method consists of encoding input messages so that hash function inputs are placed in a transformed domain, and then applying a transformed cryptographic hash function to produce an encoded output digest; the transformed cryptographic hash function implements the cryptographic hash function in the transformed domain.

25 Claims, 9 Drawing Sheets

(51) Int. Cl.
   *H04L 9/06*  (2006.01)
   *G06F 7/76*  (2006.01)

(56) References Cited

U.S. PATENT DOCUMENTS

2009/0279691 A1 11/2009 Farrugia et al.
2012/0002807 A1 1/2012 Michiels et al.

FOREIGN PATENT DOCUMENTS

| JP | 2010510539 A | 4/2010 |
|---|---|---|
| WO | 0115163 A1 | 3/2001 |
| WO | 2010102960 A1 | 9/2010 |
| WO | 2010146139 A1 | 12/2010 |

OTHER PUBLICATIONS

S. Halevi and H. Krawczyk, "Strengthening Digital Signatures via Randomized Hashing", Advances in Cryptography 2006, Lecture Notes in Computer Science, vol. 4117, Jan. 30, 2007, pp. 1-27. "whole document".
R. Glabb et al., "Multi-mode operator for SHA-2 hash functions", Journal of Systems Architecture, vol. 53, 2007, pp. 127-138 "whole document".
S. Halevi and H. Krawczyk, "The RMX Transform and Digital Signatures", Aug. 22, 2006, pp. 1-16, Accessed online: http://webee.technion.ac.il/~hugo/rhash/rhash-nist.pdf whole document.
Dang, "Randomized Hashing for Digital Signatures", NIST Special Publication SOO-106 (US Department of Commerce), Feb. 2009, pp. 1-17. "whole document".
Secure Hash Standards (SHS), Federal Information Processing Standards Publication (FIPS PUB)I80-3 (US Department of Commerce), Oct. 2008, pp. 1-32. "whole document".
N. Sklavos and O. Koufopavlou, "On the Hardware Implementations ofthe SHA-2 (256, 3S4, 512) Hash Functions", Proceedings of the 2003 International Symposium on Circuits and Systems, ISCAS '03, vol. 5, 2003, pp. V-153-V-156 "whole document".
Extended European Search Report cited in corresponding European Application No. 11862529.2 dated Jul. 30, 2014.
"DRM Specification; OMA-TS-DRM_DRM-V2_1-20081106-A" OMA-TS-DRM_DRM-V2_1-20081106-A, Open Mobile Alliance (OMA), 4330 La Jolla Village Dr., Suite 110 San Diego, CA 92122; USA, No. 2.1 6, Nov. 6, 2008.
Shai Halevi et al: "Strengthening Digital Signatures Via Randomized Hashing" Aug. 20, 2006, Advances in Cryptology-Crypto 2006 Lecture Notes in Computer Science; LNCS, Springer, Berlin, DE, pp. 41-59.
S. Chow, P. Eisen, H. Johnson, P.C. Oorschot, "White-Box Cryptography and an AES Implementation", Selected Areas in Cryptography : 9th Annual International Workshop, Aug. 15, 2002, vol. 2595, pp. 1-18.

\* cited by examiner

US 9,443,091 B2

METHOD AND SYSTEM FOR PROTECTING EXECUTION OF CRYPTOGRAPHIC HASH FUNCTIONS

FIELD OF THE INVENTION

The present invention relates generally to digital cryptography. More particularly, the present invention relates to protecting the operation of cryptographic hash functions in a white-box attack environment.

BACKGROUND OF THE INVENTION

Cryptographic hash functions are used to produce digital "fingerprints" of data and are a component of many cryptosystems. Such hash functions take arbitrary length bit-strings as input and map them to fixed length bit-strings as output. An input is commonly referred to as a message, and its output is commonly referred to as a digest.

An important distinction between hash functions and other cryptographic primitives (e.g. block ciphers) is that hash functions have no key (i.e. they are un-keyed primitives). This means that, given an input message, anyone can compute its digest. There are a number of cryptographic hash functions that have been specified in publicly-available standards. For example, Secure Hash Standard (SHS), FIPS PUB 180-3 (U.S. Department of Commerce), October 2008, the content of which is hereby incorporated by reference in its entirety, specifies five cryptographic hash functions: SHA-1, SHA-224, SHA-256, SHA-384, SHA-512. Given an input to a hash function, it is very easy to compute its output. However, secure cryptographic hash functions must satisfy a mathematical property known as pre-image resistance or "one-way-ness," which means that, given an output, it is very difficult to compute an input that hashes to that output. Thus, hash functions have an important asymmetry: they are easy to evaluate, but hard to invert.

Well-known applications of cryptographic hash functions include digital signature schemes, message authentication codes, pseudo-random number generation, code-signing schemes, password based authentication, and key derivation functions. Hash functions are also used to recover content keys in digital rights management ("DRM") schemes. This is the case for the Open Mobile Alliance ("OMA") DRM, which is deployed on portable electronic devices such as mobile phones. Content providers protect their content (e.g. videos, songs, games, etc.) in the OMA DRM system before delivery to end-users by encrypting it using symmetric keys called content-encryption keys. If a user makes a request to play protected content on their phone, that phone's DRM Agent first checks permissions specified inside a rights object issued for that content. Assuming the request is authorized, the DRM Agent will then do a computation to recover the required content-encryption key from data inside the rights object. The content is then decrypted and played. The cryptographic operations done by the DRM Agent to recover content-encryption-keys are described in Section 7.1.2 of the OMA DRM Specification, v. 2.1, 6 Nov. 2008, the contents of which are incorporated herein by reference in their entirety. This computation includes the use of a key derivation function based on a hash function such as SHA-1 or SHA-256.

Malicious users may attempt to extract content keys by analyzing the software implementing the DRM Agent. In particular, in a white-box environment, where an attacker has full control over the execution environment and the software implementation (unless the computing device is physically secured), the attacker has access to the code, the data structures and the execution environment. An attacker operating in such an environment can observe the output of the hash function by doing memory dumps or by running the DRM Agent in a debugger. If the content-encryption keys recovered by the DRM Agent are exposed, a malicious attacker could access them, and use them to decrypt the content off-line and free it from restrictions imposed by rights objects (i.e. they would be able to circumvent the DRM). Thus, it is important that the cryptographic operations carried out by the DRM Agent be concealed from the user.

It is, therefore, desirable to provide hashing of messages without revealing either the message, digest or any intermediaries between the two of them so that the hashing operation itself is resistant to white-box attacks.

SUMMARY OF THE INVENTION

According to an aspect, there is provided a computer-implemented method of protecting execution of a cryptographic hash function, such as SHA-1, SHA-224, SHA-256, SHA-384, or SHA-512, in a computing environment where inputs, outputs and intermediate values can be observed. The method comprises encoding an input message to provide an encoded input message in a transformed domain. A transformed cryptographic hash function is then applied to provide an output digest. The transformed cryptographic hash function implements the cryptographic hash function in the transformed domain. The output digest is then encoded to provide an encoded output digest. Non-transitory computer-readable media containing instructions, which when executed by a processor cause the processor to perform the method are also provided.

According to embodiments, the input message can be received in an encoded form, and can be re-coded in accordance with an internal encoding. The encoded input message can be padded with un-encoded padding bytes to provide a padded message, and the padded message can be divided to provide at least one array of encoded words and un-encoded padding words. Each array can be processed according to the transformed secure hash function, such that intermediate values containing any portion of the input message are always encoded. The initial state variables and constants can be initialized and then used in hash function iterations to provide updated state variables. An output encoding can be applied to the updated state variables to provide encoded state variables, and the encoded state variables can be concatenated to provide the output digest. Mappings of the component functions used in the hash function in the transformed domain can be determined, and used in each hash function iteration. These mappings can be stored in look-up tables, and can be used to expand the number of words in each array, and to provide intermediate values of the state variables.

According to a further aspect, there is provided a computer-implemented method of deriving an encryption key for Digital Rights Management (DRM) content using a cryptographic hash function. The method comprises encoding an input message to provide an encoded input message in a transformed domain. A transformed cryptographic hash function, which implements the cryptographic hash function in the transformed domain, is then applied to provide the encryption key, and the encryption key is encoded.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for creating secured software implementations of cryptographic hash functions that are resistant to attack in a white-box environment. As used herein, a white-box environment is an environment in which an attacker has full control over the execution environment and the software implementation. In other words, the attacker has access to the code, the data structures and the execution environment. U.S. Pat. No. 7,397,916 to Johnson et al., entitled, 'SYSTEM AND METHOD FOR OBSCURING BIT-WISE AND TWO'S COMPLEMENT INTEGER COMPUTATIONS IN SOFTWARE' contains background information on the white-box attack environment and is incorporated herein by reference.

The secured cryptographic hash implementations described herein permit the inputs and outputs of the hash computation to be encoded. As used herein, an encoding is an invertible function (e.g. from bytes to bytes, or words to words), that is used to conceal sensitive data. The present disclosure describes how to accept encoded messages and produce encoded digests without exposing the un-encoded values in memory (i.e. the messages, digests, and intermediate values).

Embodiments of the present disclosure transform a hashing algorithm to operate in a transformed domain, and to act on transformed inputs and/or produce transformed outputs in an efficient way without exposing the protected asset at any time, thereby securing operation of the hash function against white-box attacks. The embodiments achieve this while still maintaining compatibility with the original hashing algorithm. Compatibility in this context means that a secured implementation receiving an encoded message input and producing an un-encoded output digest will yield the same result as a standard hash function implementation receiving the un-encoded message input.

Conventional Hashing Algorithms

An example cryptographic hash function is the SHA-256 algorithm, as described in Secure Hash Standard (SHS), FIPS PUB 180-3 (U.S. Department of Commerce), October 2008. FIGS. 1-4 and their accompanying descriptions describe the conventional implementation of the SHA-256 algorithm. The SHA-256 algorithm is provided as an example only, and is used to illustrate the present invention. However, one of ordinary skill in the art will appreciate that embodiments of the present disclosure can be applied to any cryptographic hash function.

Figure 1:
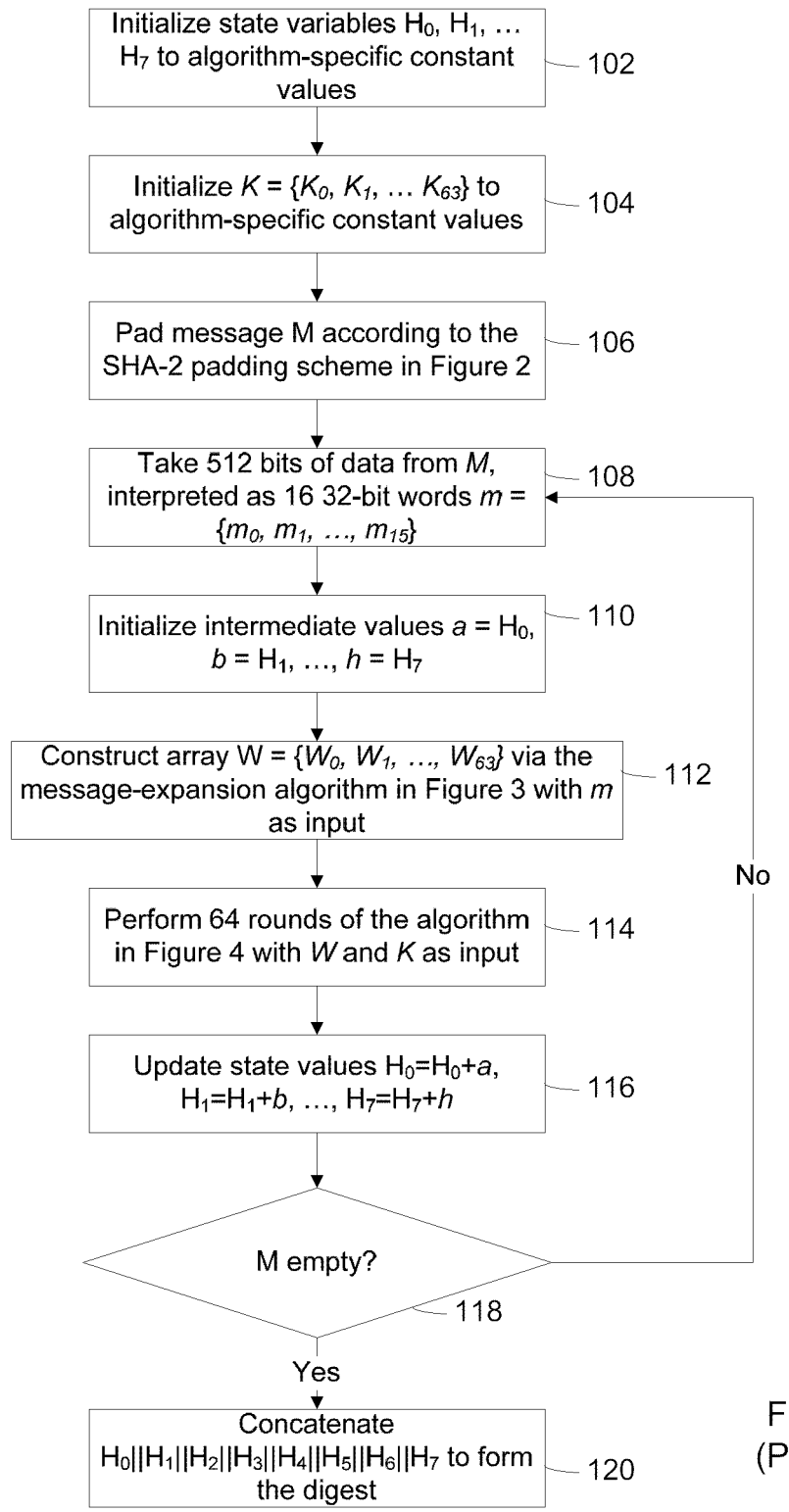
FIG. 1 is a flow chart depicting a high-level overview of a conventional implementation of the SHA-256 algorithm.

FIG. 1 shows a high-level overview of a byte-oriented hash implementation of the SHA-256 algorithm. As will be understood by those of skill in the art, bit-oriented implementations can also be supported.

The eight initial hash values $H_i$ (also referred to herein as state variables) and sixty-four constant values $K_j$ are first initialized to specific constant values as defined in the algorithm specification (steps 102, 104).

Figure 2:
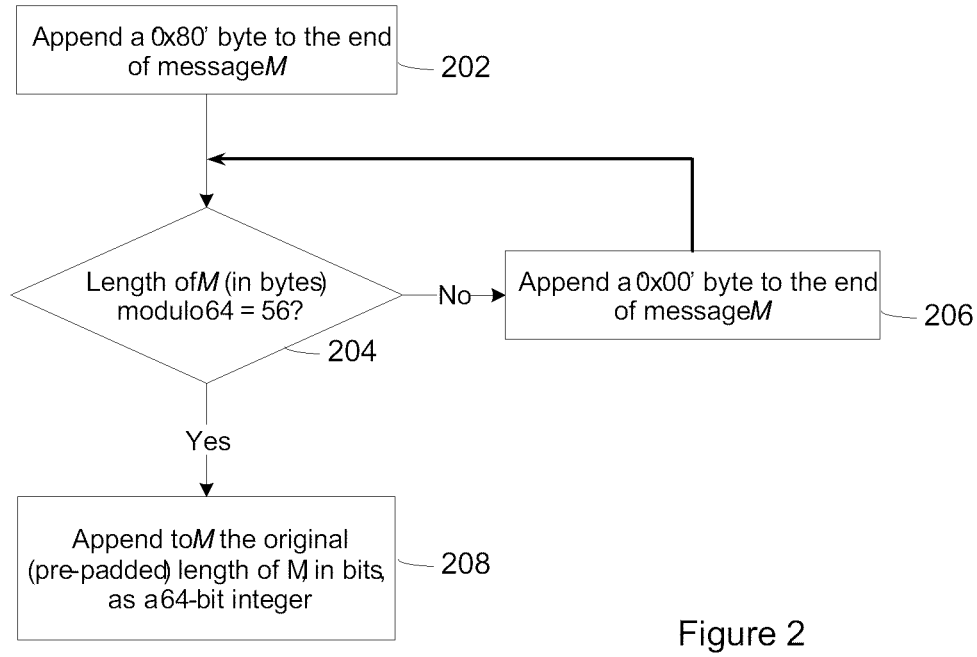
FIG. 2 is a flow chart depicting the message padding process for the SHA-256 algorithm.

The input message M is then preprocessed. The message is first padded (step 106) according to the algorithm in FIG. 2. As shown in FIG. 2, a 0x80 byte is appended to the end of message M (step 202). Further 0x00 padding bytes are then appended to end of the message M until the length of M (in bytes) is 56 modulo 64 (steps 204, 206). The original length of M in bits is then appended to M as 64-bit big-endian integer (i.e. 8 bytes) (step 208). Thus, the padding process yields a padded message whose length in bytes is congruent to 0 modulo 64. Referring again to FIG. 1, the message is then divided into 64-byte blocks, where each block is interpreted as an array m of sixteen 32 bit, big-endian words (step 108).

Figure 3:
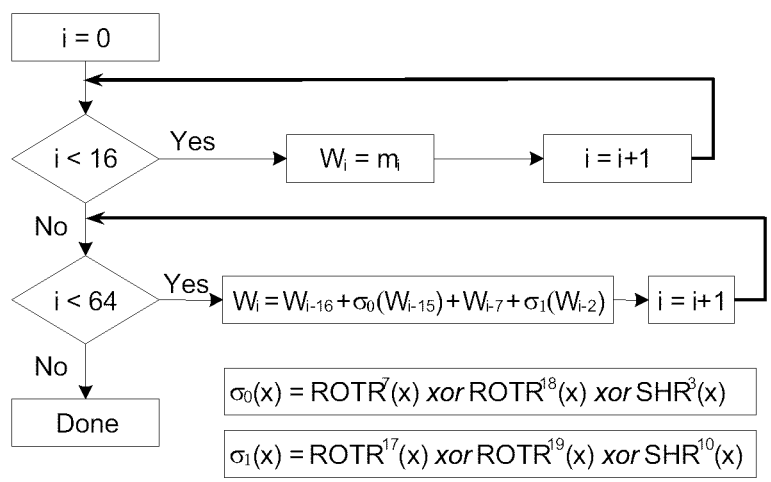
FIG. 3 is a flow chart depicting the message block expansion process for the SHA-256 algorithm.

After initializing intermediate values a, b, . . . h (step 110), each array m is expanded into an array W of sixty-four 32-bit words (step 112), as detailed in FIG. 3. As shown in FIG. 3, for $0 \le i \le 15$, the elements $W_i = _i$, and for $16 \le i \le 63$, the elements $W_i = W_{i-16} + \sigma_0(W_{i-15}) + W_{i-7} + \sigma_1(W_{i-2})$, where the a functions are defined as shown according to "rotate right" (ROTR) and "shift right" (SHR) functions.

Figure 4:
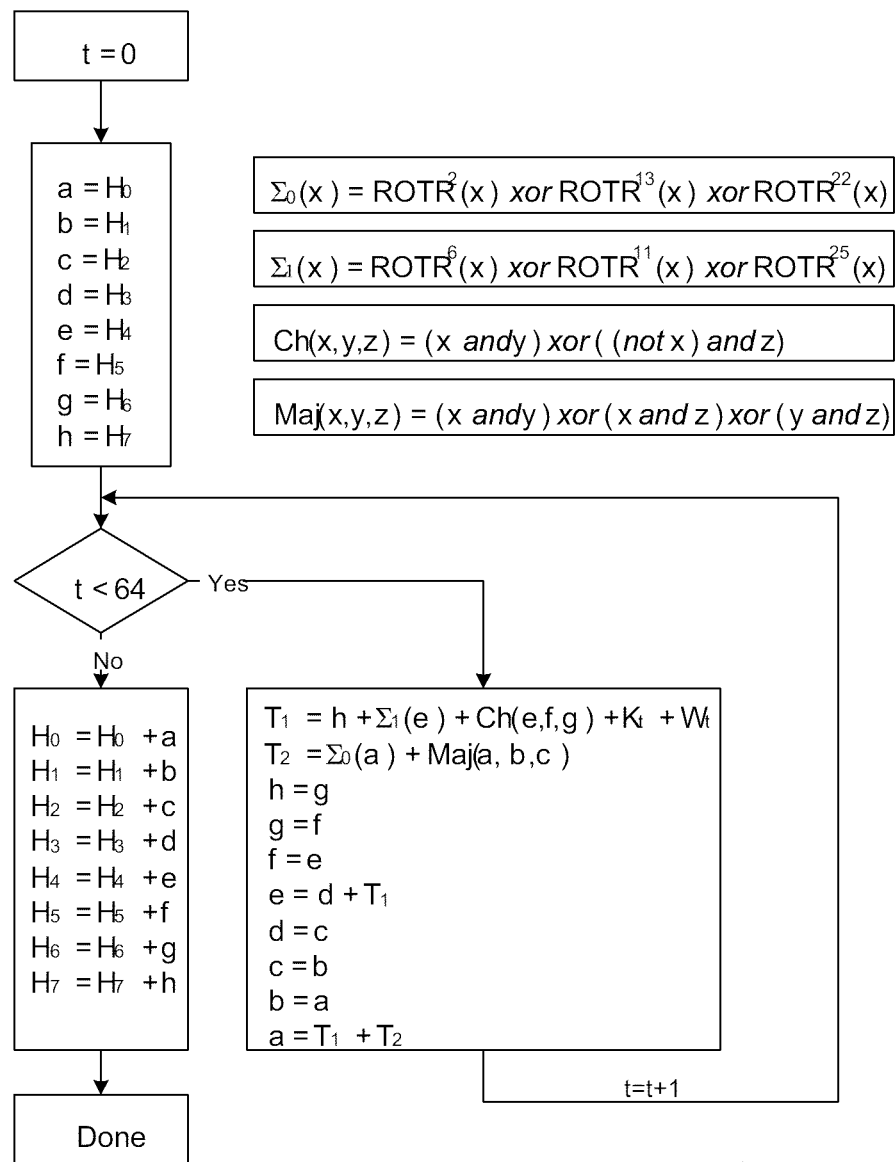
FIG. 4 is a flow chart depicting the processing of temporary values using a compression algorithm for the SHA-256 algorithm.

For each element of the array W, the eight hash values $H_i$ are copied into temporary processing values (a through h), which are mapped as shown in the flow diagram in FIG. 4 (step 114), and fed back into the eight intermediate digest values $H_i$ (step 116), until all blocks of the padded message M have been processed (step 118). The final hash digest is a 256-bit value formed by concatenating the final eight $H_i$ values after all message blocks m have been processed (step 120).

The following properties of the standard SHA-256 algorithm, which are important when considering to how secure an implementation for a white-box attacker, can be deduced from the description above:

1. The input message must be accessible (readable) in order to construct the W array.
2. Construction of the W array as shown in FIG. 3 uses only "shift", "exclusive-or" (XOR), and "add" operations. As is well understood, the rotate operations can be implemented with "shifts" and XORs. For example, a right rotation of a 32 bit word x by n bits can be done by a right shift of x by n XOR-ed with a left shift of x by (32-n).
3. The first 16 values in the W array are exactly the 16 words m, which are exactly the 512 bits of M currently being processed.
4. Padding bits are present in the final message block and may be present in the second-to-last message block, depending on the length of the message M. These padding bits are known values. It is assumed that an attacker knows the length of M and therefore knows all padding bits and where the padding begins.

5. While processing the first message block with the method in FIG. 4, the values H, and therefore a through h, are all fixed, known values that can be predicted based on the algorithm being used. "Unknown" values (message bits or values derived from message bits) are mixed in only through the W array in constructing $T_1$ as shown in FIG. 4. These unknown values propagate into the state variables through the addition of $T_1$ and the progression of values through the state variables at a rate of two per round (a and e after round 1, a, e, b, and f after round 2, etc.). All state values contain "unknown" data only after round 4 of the first message block. Subsequent message blocks begin from the last state of the previous block and therefore contain unknown data from the start.

6. The message block processing, or compression, algorithm of FIG. 4 uses only shift, exclusive or, and, not, and add operations. The exclusive or can be expressed as a combination of an add and an and.

7. In many applications the message and digest are treated as arrays of bytes, but the SHA-2 algorithms internally operate on them as 32- or 64-bit words.

Encoding Functions

Figure 5:
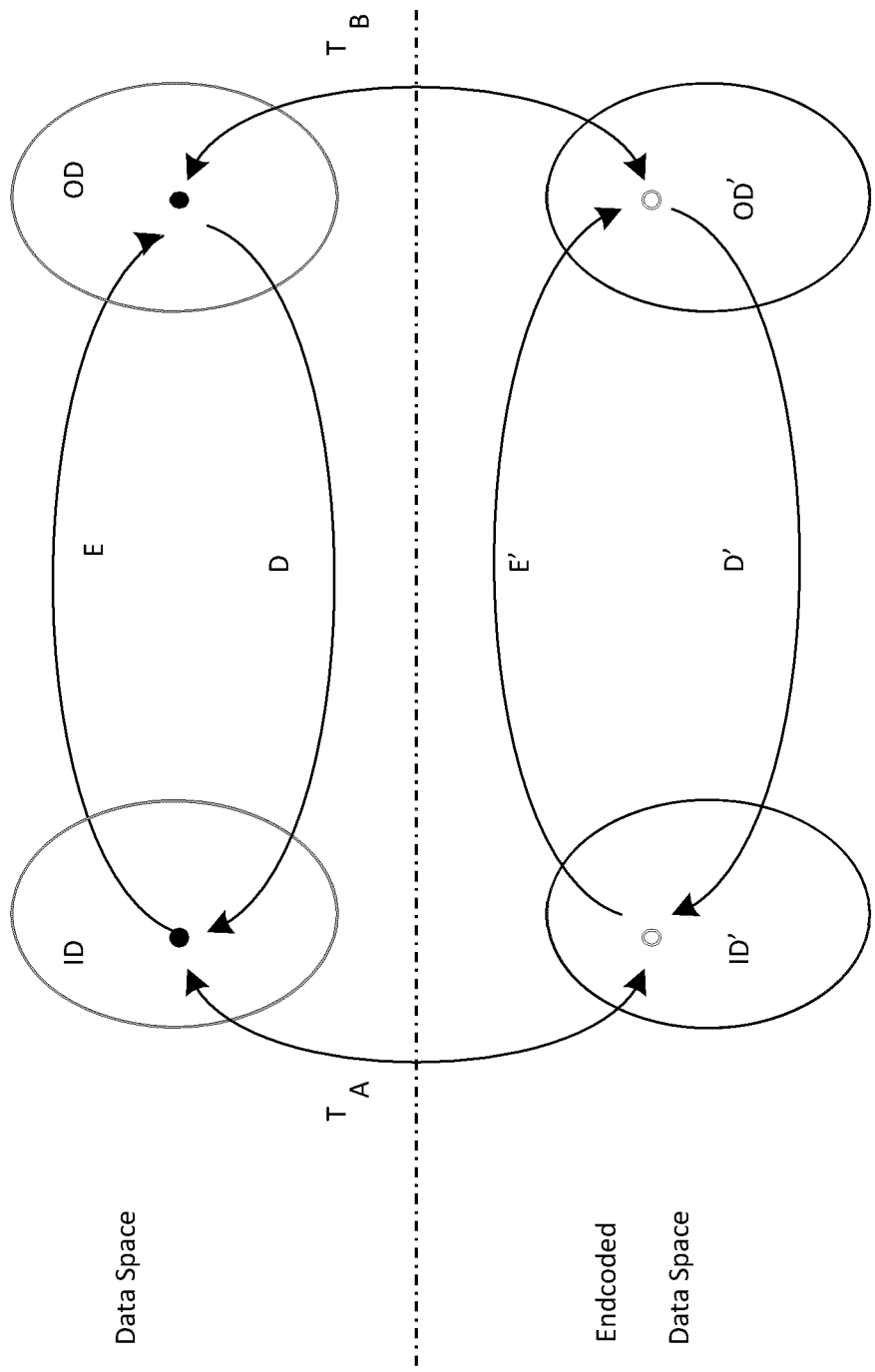
FIG. 5 is shows a generalized implementation of encryption and decryption functions in a transformed and non-transformed domains.

The input and/or output to secured software implementations of cryptographic encryption and decryption functions consists of encoded parameters that require specific adaptations in the modules that interface with the secured software implementation. FIG. 5 shows an application with an operation that uses a function E to map an input domain ID to an output domain OD. The reverse operation D maps the output values back to values in the input domain ID. The diagram also shows a transformation $T_A$ that maps the input domain ID to a encoded input domain ID' and a transformation $T_B$ to map the values in the encoded output domain OD' to the output domain OD. $T_A$ and $T_B$ are bijections.

Using encoding functions $T_A$, $T_B$, together with cryptographic functions E and D implies that, instead of inputting data elements of input domain ID to encryption function E to obtain encrypted data elements of output domain OD, transformed data elements of domain ID' are input to transformed encryption function E' by applying transformation function $T_A$. Transformed encryption function E' combines the inverse transformation functions $T_A^{-1}$ and/or $T_B^{-1}$ in the encryption operation to protect the confidential information, such as the key. Then transformed encrypted data elements of domain OD' are obtained. Similarly, D' decrypts datavalues in OD' and maps them to values in the ID'. By performing $T_A$ and/or $T_B$ in a secured implementation, the keys for encryption functions E or decryption function D cannot be retrieved when analyzing input data and output data in the transformed data space.

At least one of the transformation functions $T_A$, $T_B$ should be a non-trivial function (i.e. it should be different from the identity function). If $T_A$ is the identity function, the input domains ID and ID' will be the same domain. If $T_B$ is the identity function, the output domains are the same domain.

Encodings in Hashing Algorithms

In the OMA DRM example, the output of the hash function is used to recover a content-encryption key. Thus, in this situation, encodings should at least be applied to the digests. However, encoding only the digests does not provide sufficient protection. Since hash functions are un-keyed, if an attacker can observe un-encoded inputs, then they can compute un-encoded outputs using their own implementation of the hash function defined in the OMA specification. Therefore, in an embodiment, the inputs to the hash function are encoded as well.

In most situations where a protected implementation of a cryptographic hash function is required, input messages must be encoded. Encodings help keep the message confidential from an attacker (i.e. the message cannot easily be read) and make it difficult for the attacker to change the message in a meaningful way, thus providing a form of message integrity. Encodings must be maintained throughout at least some of the hashing algorithm so that it is difficult for an attacker to work backwards from an intermediate state and calculate a possible un-encoded input message.

Note that producing an un-encoded digest from an encoded message does not necessarily reveal the un-encoded message. The one-way function property of secure cryptographic hash functions means that it is computationally infeasible to find an input message that produces the given digest. It is thus possible for application to use a secured implementation of a hash function with an un-encoded output. However, applying encodings to digests helps keep them confidential from white-box attackers and makes them difficult to alter in a meaningful way.

As noted above, an embodiment of the present disclosure uses the SHA-256 hash algorithm. The following description provides an example of how to create an implementation of SHA-256 that is resistant to white-box attacks. As one of ordinary skill in the art will appreciate, the methods and systems described may be used in a similar manner to protect the other cryptographic hash functions of the SHA-2 family (SHA-224, SHA-384, and SHA-512) with only trivial changes. Further, the methods and descriptions are sufficient for one skilled in the art to apply the same protections to other cryptographic hash functions such as SHA-1, MD5 and their ancestors.

Resistance to white-box attacks is accomplished through the use of encodings on the inputs, the outputs, and the intermediate state values of the hash algorithm. The message (input) and digest (output) can be independently protected, and, if encoded, the message or digest do not appear in their original, un-encoded form at any point in the implementation. The underlying functionality of the algorithm is not modified, meaning that the encoded digests produced by the protected implementation are identical to those produced by applying the same encoding to the digests produced by an unprotected implementation.

Robust Hashing

Protecting the hashing operation essentially involves transforming the input (message) and/or output (digest) of the hash function by applying a reversible encoding function. This encoding function can be as simple as an XOR with a fixed value or can be an arbitrarily complex function. Embodiments of the present disclosure change the hashing algorithm to act on transformed inputs and/or to produce transformed outputs in an efficient way without exposing the protected asset at any time, while still maintaining compatibility with the original hashing algorithm (i.e. an embodiment of the white-box implementation involving a transformed message input and an un-encoded output digest will yield the same hash as a standard implementation with an un-encoded form of the same message). Embodiments of the present disclosure permit transformations of size 8 bits and 32 bits (transforming 8 or 32 bits at a time, using 8- or 32-bit transformation coefficients, respectively) to allow for larger transform spaces. Portions of the hashing algorithm are replaced with table lookup operations that provide efficient mappings from transformed inputs to transformed outputs without exposing details of the transformation scheme.

Certain embodiments of this disclosure assume that both the message and digest are transformed. This configuration provides maximum security. However, an untransformed message or digest can be used at a cost of weakened security properties. A configuration using both an untransformed message and an untransformed digest is possible, but not recommended, as it affords limited protection. The described embodiments assume 8-bit transformations are used for both message and digest; however, further embodiments support 32-bit transformations, as discussed below.

Figure 6:
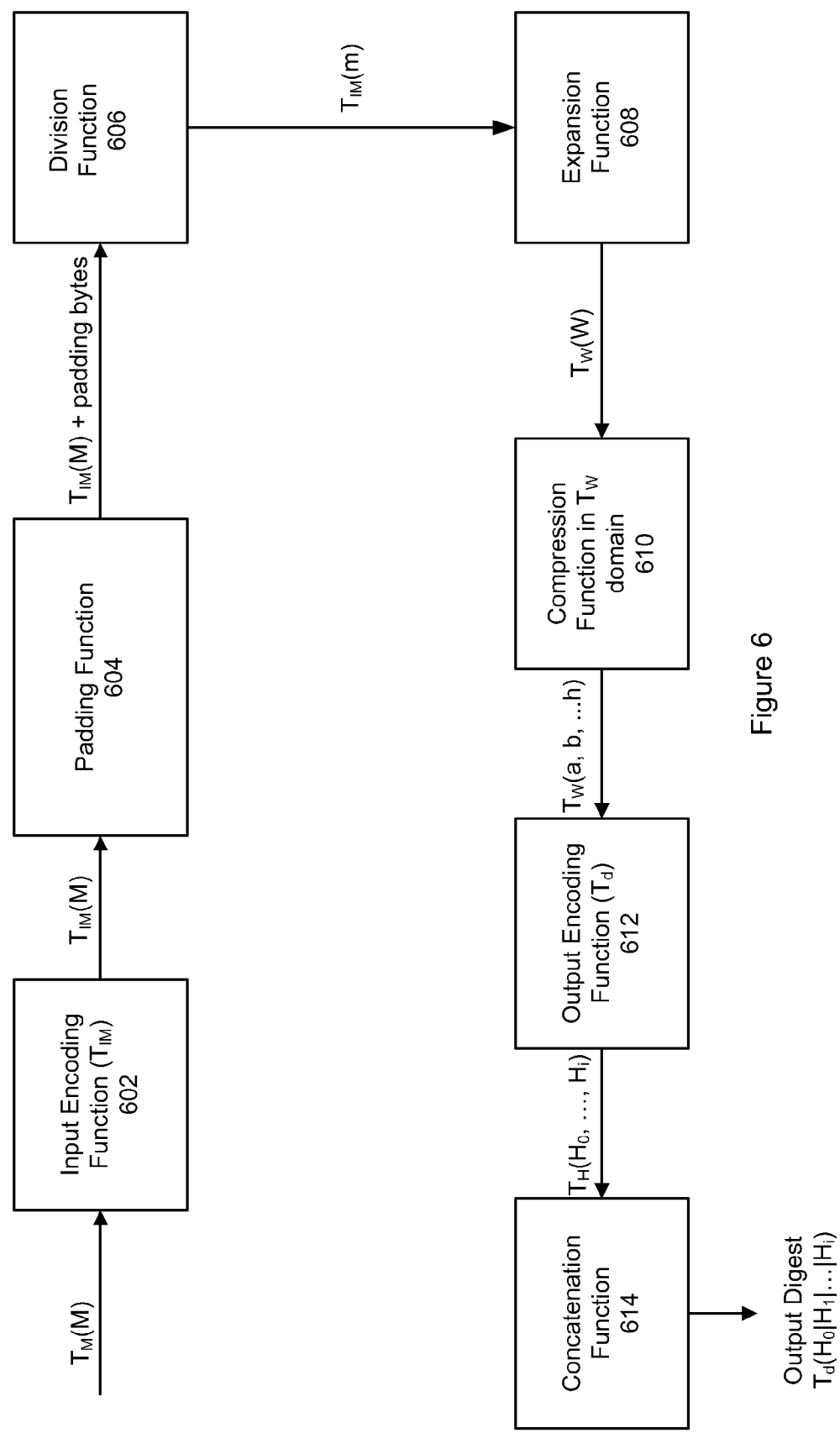
FIG. 6 is a block diagram of a system for protecting operation of a cryptographic hash function according to an embodiment.

FIG. 6 is a high-level block diagram of a system for protecting the operation of a cryptographic hash function. A protected implementation of the SHA-256 algorithm, in accordance with one embodiment of the present disclosure, is then described in relation to FIGS. 7-10. Embodiments where input or output encodings are not used are easily derived from the above by setting $T_M$ or $T_d$ to the identity transformation (note that $T_M$ and $T_d$ are, respectively, the message input-encoding and the digest output-encoding). This impacts only the mapping from $T_M$ to $T_{IM}$ and from $T_H$ to $T_d$. However, these instances are less secure since known values will be encoded with internal transformations which may allow an attacker to attack the transformations and recover encoded assets.

As shown in FIG. 6, an input message M, encoded according to an encoding function $T_M$ is re-encoded to input encoding function $T_{IM}$ 602. The resulting encoded message in the IM-domain, $T_{IM}(M)$, is then padded according to a padding function 604 to a length as determined by the cryptographic hash function. For example, for SHA-256, the length of the padded, $T_{IM}$-encoded input message is 0 mod 64 bytes. As discussed in greater detail below, the padding bytes are un-encoded, except for, according to one embodiment, initial padding bytes needed to bring the message length up to a multiple of 4-bytes, which padding bytes are encoded in the $T_{IM}$ domain. This embodiment provides for additional security, as it ensures that no un-encoded padding bytes are included with message bytes within the same word boundary. This ensures that the message bytes can be uniformly divided into words without worry that portions of a word are encoded and other portions are un-encoded. However, as one of ordinary skill in the art will appreciate, embodiments of the present disclosure will function if all padding bytes are un-encoded.

The padded, $T_{IM}$-encoded message is then pre-processed to divide it into blocks of words of a pre-determined length by the blocking, or division, function 606. For example, in a protected implementation of SHA-256, the padded, $T_{IM}$-encoded input message is first divided into 64-byte "chunks", and each chunk is subsequently divided into a block of 16, 32-bit words resulting in a 16-word, encoded array $T_{IM}(m)$.

Each $T_{IM}(m)$ array is then processed by applying transformed functions in the $T_{IM}$-domain. For a transformed SHA-2 hash function, as shown, a given $T_{IM}(m)$ array is first processed according to an expansion function in the $T_{IM}$-domain 608 to provide an encoded array $T_W(W)$. For example, for a SHA-256, the expansion function results in an encoded $T_W(W)$ array composed of 64, 32-bit words. This expanded array is then compressed by a compression function in the $T_W$-domain 610, resulting in encoded intermediate values $T_W(a, b, h)$. Once all the chunks of the message have been processed, the final intermediate values are optionally encoded using an encoding function $T_H$ 612 to provide encoded output hash values $T_W(H_0, H_1 \ldots H_7)$. These output hash values are then concatenated by a concatenation function 614 to generate an encoded output digest $T_d(D)$ of the original input message M.

Figure 7:
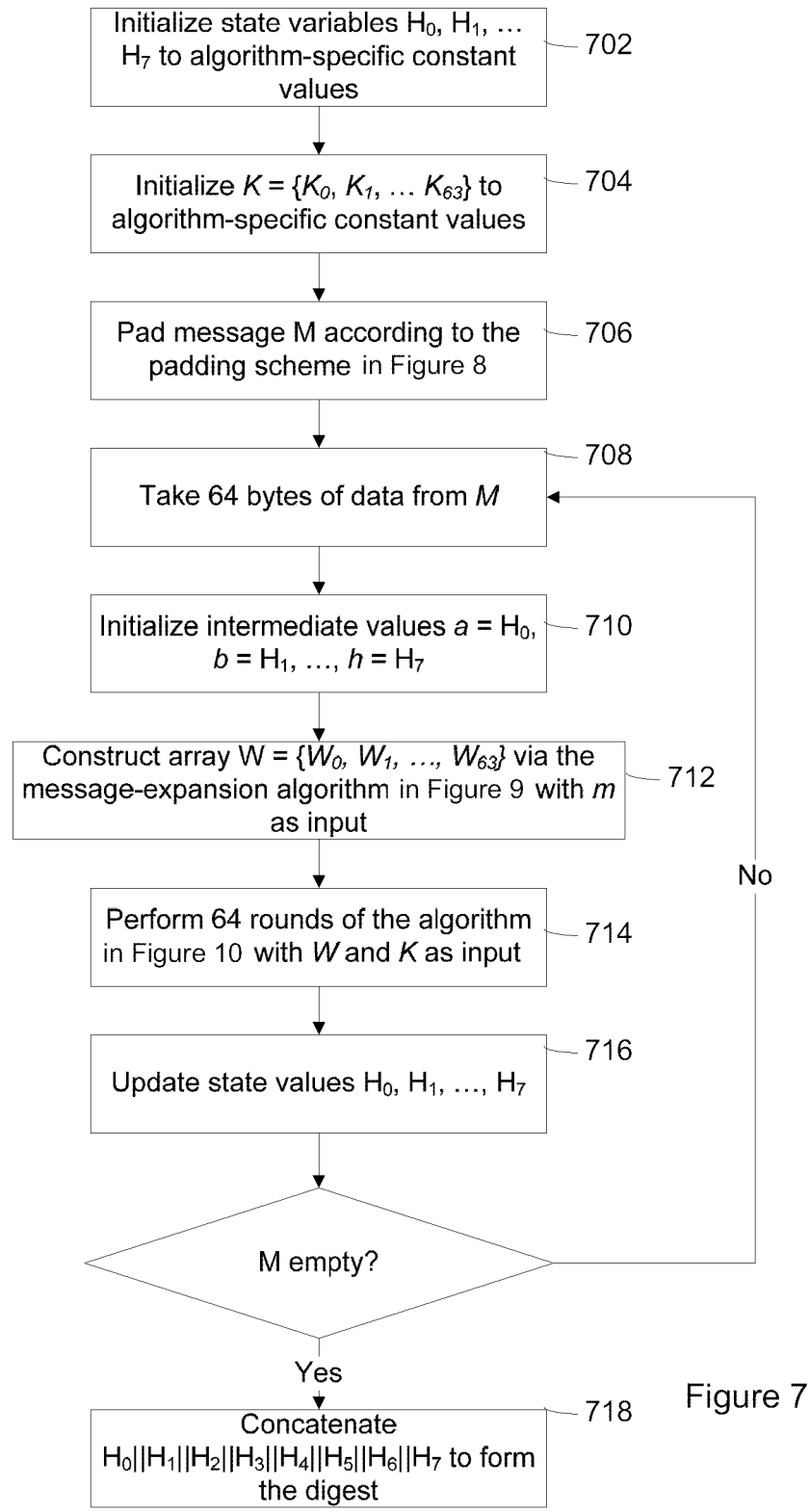
FIG. 7 is a flow chart of a secured implementation of the SHA-256 algorithm according to an embodiment.

The operation of the present method will now be described in greater detail with reference to a transformed implementation SHA-256, and as shown in FIGS. 7-10. As shown in FIG. 7, the state variables $H_0$ through $H_7$ are initialized to the values as specified by the hash function standard (step 702). The sixty-four $K_0 \ldots K_{63}$ values are also initialized to their constant values as defined in the hash algorithm specification (step 704). These variables are initially un-encoded, helping to ensure that the attacker cannot use the known predefined values to attack the transformation on $H_0$ through $H_7$.

Message data M is input to the algorithm in encoded format using the encoding scheme $T_M$. This transformation may be byte or word-oriented. $T_M$ is the "interface" encoding between the hash implementation and the module that uses the protected hash function. The $T_M$ encoding can be unique to the application, or unique to the instance of use for the hashing algorithm within the application. In some embodiments, the external transformation $T_M$ is converted to an internal, arbitrarily chosen 8-bit transform $T_{IM}$. $T_M$ encoded bytes/words are re-encoded with the $T_{IM}$ encoding (e.g., $x'=T_{IM}(T^{-1}{}_M(x))$). According to a preferred embodiment, the re-coding is preferably done as a combined operation rather than a decode followed by an encode; in this way the encoding schemes are not exposed. As described below, the $T_{IM}$ transformation is useful for handling padding bytes without exposing the transformation $T_M$. The message M is then padded (step 706) to yield a padded encoded message.

Figure 8:
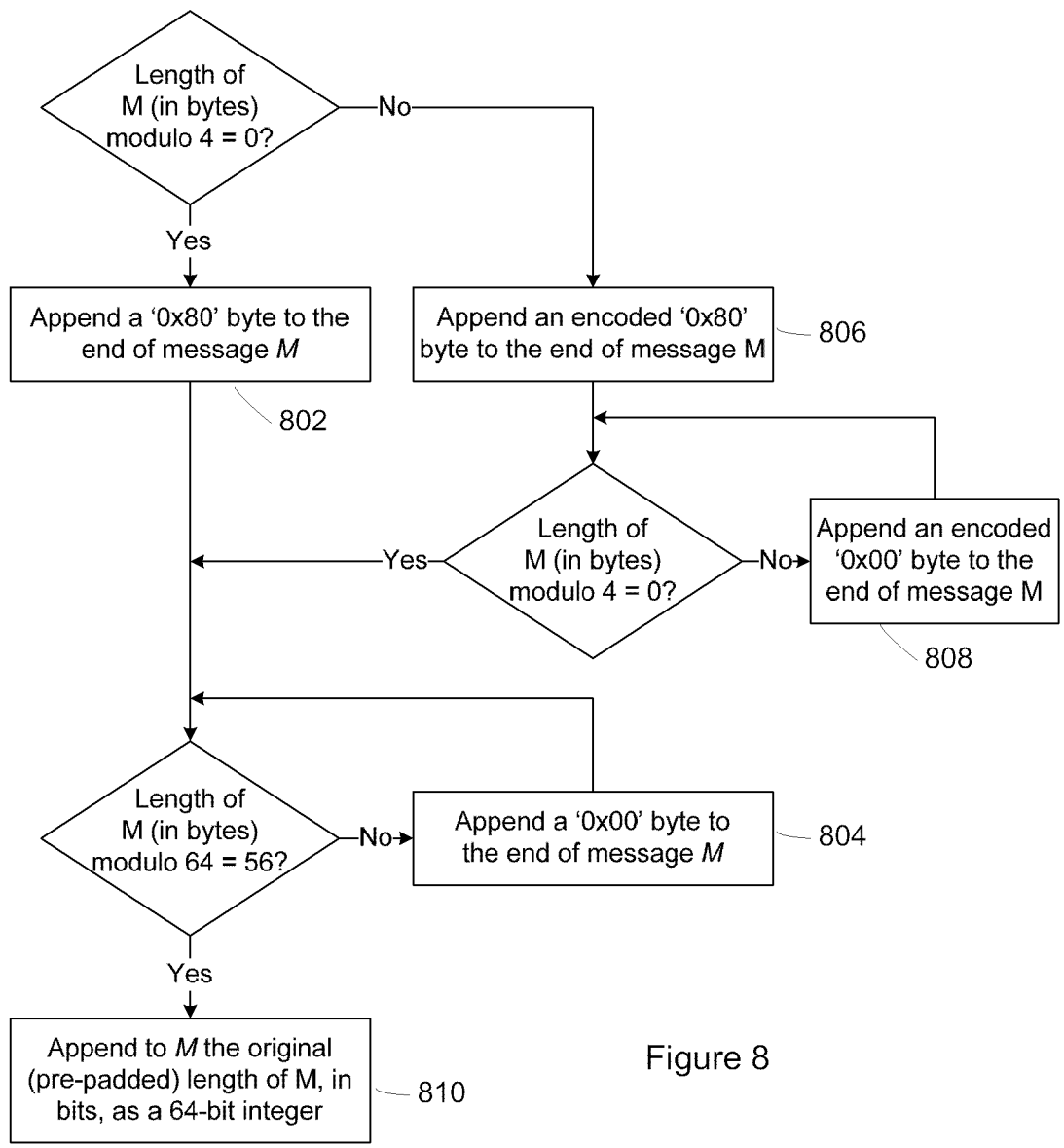
FIG. 8 is a flowchart depicting a padding process for an encoded implementation of the SHA-256 algorithm according to an embodiment.

The padding method is shown in FIG. 8. Generally, padding bytes are added in un-encoded form to reduce the risk that known padding bytes can be used to attack the transformation $T_{IM}$ on the message. To simplify the division of message bytes into message words, the transition from encoded to un-encoded form is preferably performed at a 32-bit word boundary. If the length of the encoded message M is 0 mod 4, an un-encoded 0x80 byte and zero or more un-encoded 0x00 bytes are appended to the end of the message until the length of the padded message is 56 mod 64 (steps 802, 804). If the length of the encoded message M is not 0 mod 4, a $T_{IM}$-encoded 0x80 byte and zero to two $T_{IM}$-encoded 0x00 bytes are appended to the end of encoded message M until its length is 0 mod 4 (steps 806, 808), after which un-encoded 0x00 bytes are appended to the end of the message until to the end of the padded message until its length is 56 mod 64 (step 804). These $T_{IM}$-encoded 0x80 and 0x00 values may be pre-computed rather than determined at runtime. The $T_{IM}$ transform is preferably chosen such that exposing the values 0x80 and 0x00 need not expose other values. The original length of the message M (in bits) is then appended to the padded message as a 64-bit integer (step 810). Note that since this length field is always 8 bytes long and ends a 512-bit chunk, it will always be word-aligned. Note that this is a simplified implementation suitable for applications where all messages have a length in bits congruent to 0 mod 8 (i.e. they are byte-oriented rather than bit-oriented). Extending this scheme to bit-oriented messages can be trivially accomplished through additional encoded values to cover the remaining possible values of the byte containing the initial '1' padding bit (with a possible security implication that more of $T_{IM}$ exposed). However, a wide variety of applications for hashing algorithms do not require bit-wise hashing.

Returning to FIG. 7, the padding process yields a padded message whose length in bytes is congruent to 0 modulo 64.

The $T_{IM}$-encoded message bytes are thus divided into 64-byte chunks (step 708). The bytes in each chunk are further divided into 32-bit, big-endian words to form the sixteen words of the array m. After initializing the intermediate values a, b . . . h to the current values of $H_0$ . . . $H_7$ (step 710), the array W is constructed using the message expansion function shown in FIG. 9 (step 712).

Figure 9:
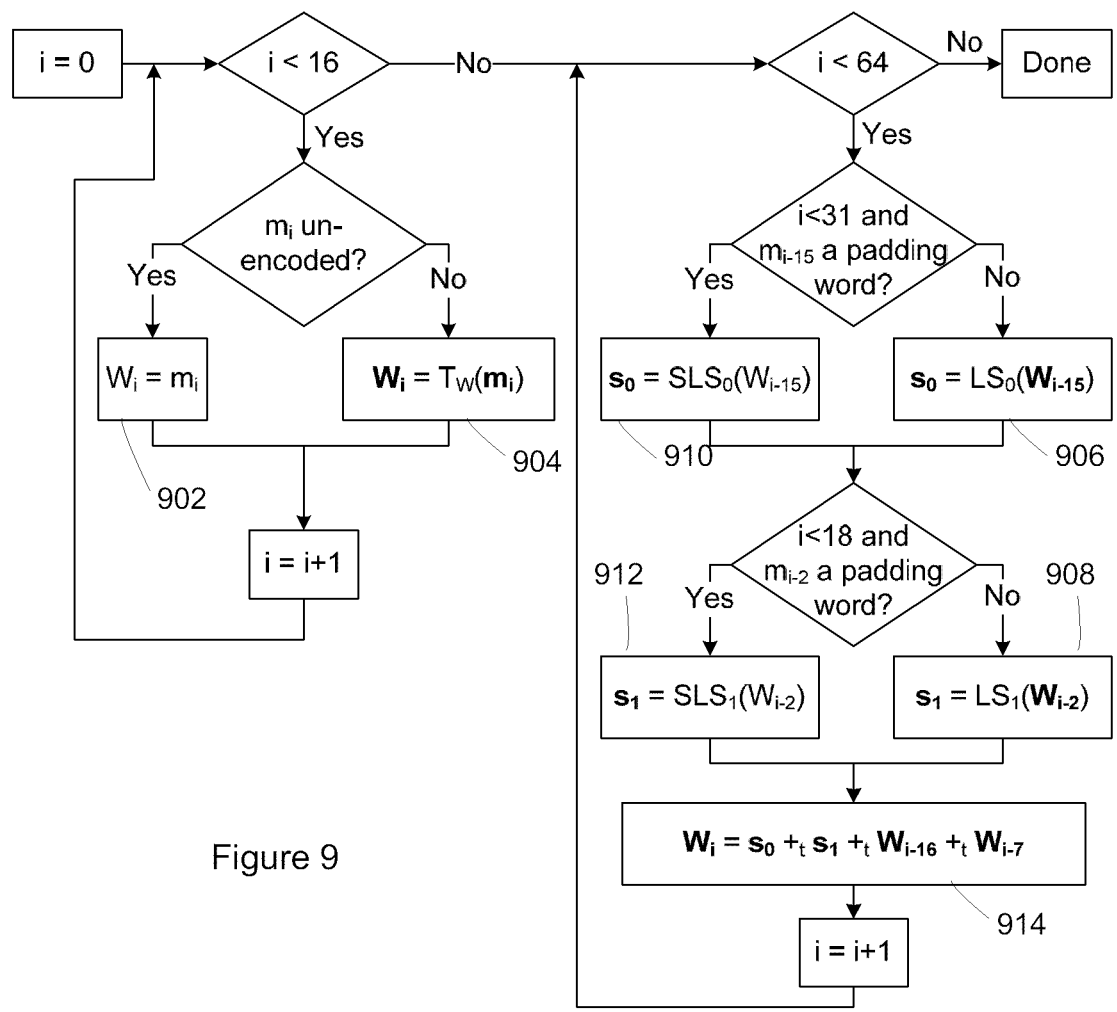
FIG. 9 is a flowchart depicting secured implementation of the $W_i$ array message expansion according to an embodiment.

As shown in FIG. 9, the first 16 elements of the array W ($W_i$ for $0 \leq i \leq 15$) are first determined and stored. In processing, the message bytes will at some point transition into un-encoded padding bytes. Un-encoded padding bytes are stored in the W array in un-encoded form. Note that the padding process as outlined in FIG. 8 above ensures that the transition from encoded to un-encoded message bytes can only happen on a word boundary. Therefore, each message word $m_i$ either consists of four encoded bytes or four un-encoded bytes, but never a combination of encoded and un-encoded bytes. If $m_i$ is un-encoded (i.e if $m_i$ is a composed of only padding bytes), $W_i = m_i$ (step 902).

If $m_i$ is encoded, $W_i = T_W(T^{-1}_{IM}(m_i))$. According to a preferred embodiment, the re-coding is preferably done as a combined operation rather than a decode followed by an encode; in this way the encoding schemes are not exposed. (step 902). $T_W$ is a byte-to-word function.

In turn, these initial 16 words of the array W are expanded into an array W of sixty-four, 32-bit encoded words. These remaining elements of the W array are computed through lookup tables $LS_0$, $LS_1$, $SLS_0$, and $SLS_1$. As will be appreciated by one of ordinary skill in the art, the SHA-256 algorithm uses six logical functions, where each function operates on 32-bit words, which are represented as x, y and z. The functions are as follows:

$$\mathrm{Ch}(x,y,z) = (x \wedge y) \operatorname{xor} (\sim x \wedge z)$$

$$\mathrm{Maj}(x, y, z) = (x \wedge y) \operatorname{xor} (x \wedge z) \operatorname{xor} (y \wedge z)$$

$$\Sigma_0(x) = \mathrm{ROTR}^2(x) \operatorname{xor} \mathrm{ROTR}^{13}(x) \operatorname{xor} \mathrm{ROTR}^{22}(x)$$

$$\Sigma_1(x) = \mathrm{ROTR}^6(x) \operatorname{xor} \mathrm{ROTR}^{11}(x) \operatorname{xor} \mathrm{ROTR}^{25}(x)$$

$$\sigma_0(x) = \mathrm{ROTR}^7(x) \operatorname{xor} \mathrm{ROTR}^{18}(x) \operatorname{xor} \mathrm{SHR}^3(x) \sigma^1(x) = \mathrm{ROTR}^{17}(x) \operatorname{xor} \mathrm{ROTR}^{19}(x) \operatorname{xor} \mathrm{SHR}^{10}(x)$$

where $\mathrm{ROTR}^n(x)$ is the "rotate right," or "circular right shift" operation. If x is a w-bit unsigned word and n is an integer with $0 \leq n < w$, then $\mathrm{ROTR}^n(x)$ is given by:

$$\mathrm{ROTR}^n(x) = (x >> n) \vee (x << w - n)$$

Similarly, $\mathrm{SHR}^n(x)$ is the "right shift" operation given by $$\mathrm{SHR}^n(x) = x >> n$$

The result of each of these functions is a new 32-bit word.

According to an embodiment of the present disclosure, lookup tables are used to implement the functions $\sigma_0$ and $\sigma_1$ in the $T_{IM}$ transformed domain. The $\sigma_0$ and $\sigma_1$ functions operate on 32-bit words. However, a lookup table that maps 32-bit words to 32-bit words is very large, and so it is desirable to somehow utilize smaller lookup tables. This can be achieved by noting that both $\sigma$ functions are linear. If we express the word input x as a sequence of bytes $b_0 b_1 b_2 b_3$, then from the linearity of the $\sigma$ function we can derive the following equation:

$$\sigma(x) = \sigma(b_0 b_1 b_2 b_3) = \sigma((b_0 \ll 24) \& 0 \times ff000000) \wedge$$

$$\sigma((b_1 \ll 16) \& 0 \times 00ff0000) \wedge$$

-continued $$\sigma((b_2 \ll 8) \& 0 \times 0000ff00) \wedge$$

$$\sigma((b_3 \ll 0) \& 0 \times 000000ff)$$

This shows that the $\sigma$ function can be applied to each individual byte of the input with the other bytes set to zero. The results of the four function applications, one for each byte $b_i$, can be XORed together to obtain the same result as applying the $\sigma$ function to the word x.

To implement the $\sigma$ operation, $T_W$ encoded words are first re-coded to an arbitrary byte-wise transformation $T_\sigma$ via a word-to-byte re-encoding function. Lookup tables $LS_0$ and $LS_1$ (four of each, corresponding to the $\sigma_0$ and $\sigma_1$ functions, respectively) each map a $T_\sigma$-encoded byte to a $T_W$-encoded word representing the application of the $\sigma$ function to a particular byte in each of the four positions in the word These four partial result words are combined using an encoded XOR operation to form the complete words $s_0$ and $s_1$ (steps 906, 908). Therefore, each of the $LS_0$ and $LS_1$ tables have 4 tables each with 256 entries for all possible input bytes and each entry contains 4 bytes for the output word for a total size of 4096 bytes.

The $SLS_0$ and $SLS_1$ tables (also corresponding to the $\sigma_0$ and $\sigma_1$ functions, respectively) map un-encoded bytes to $T_W$-encoded, shifted and rotated words. The $SLS_n$ tables are used to perform the $\sigma$ operations on un-encoded padding words in the message (steps 910, 912). These tables are used when the $W_{i-2}$ or $W_{i-15}$ words are un-encoded padding words. They are similar in structure to the LS tables, except that the inputs are not encoded. The SLS and LS tables use distinct output encoding schemes. The distinct output encodings for SLS and LS tables makes it more difficult to determine the input $T_W$ encoding. For example, if the SLS and LS tables produced the same encoding and we had an un-encoded word x and the encoded word y where $SLS(x) = LS(y)$, then $T_W(x) = y$, this information could be used to attack the transformation $T_W$.

The final $W_i$ value is computed by an encoded addition function $(+_t)$ (step 914). The $s_0$ and $s_1$ values are always $T_W$-encoded, while the $W_{i-16}$ and $W_{i-7}$ values may be encoded or un-encoded padding words. Different encoded addition functions may be used to handle the different encoding cases.

Figure 10:
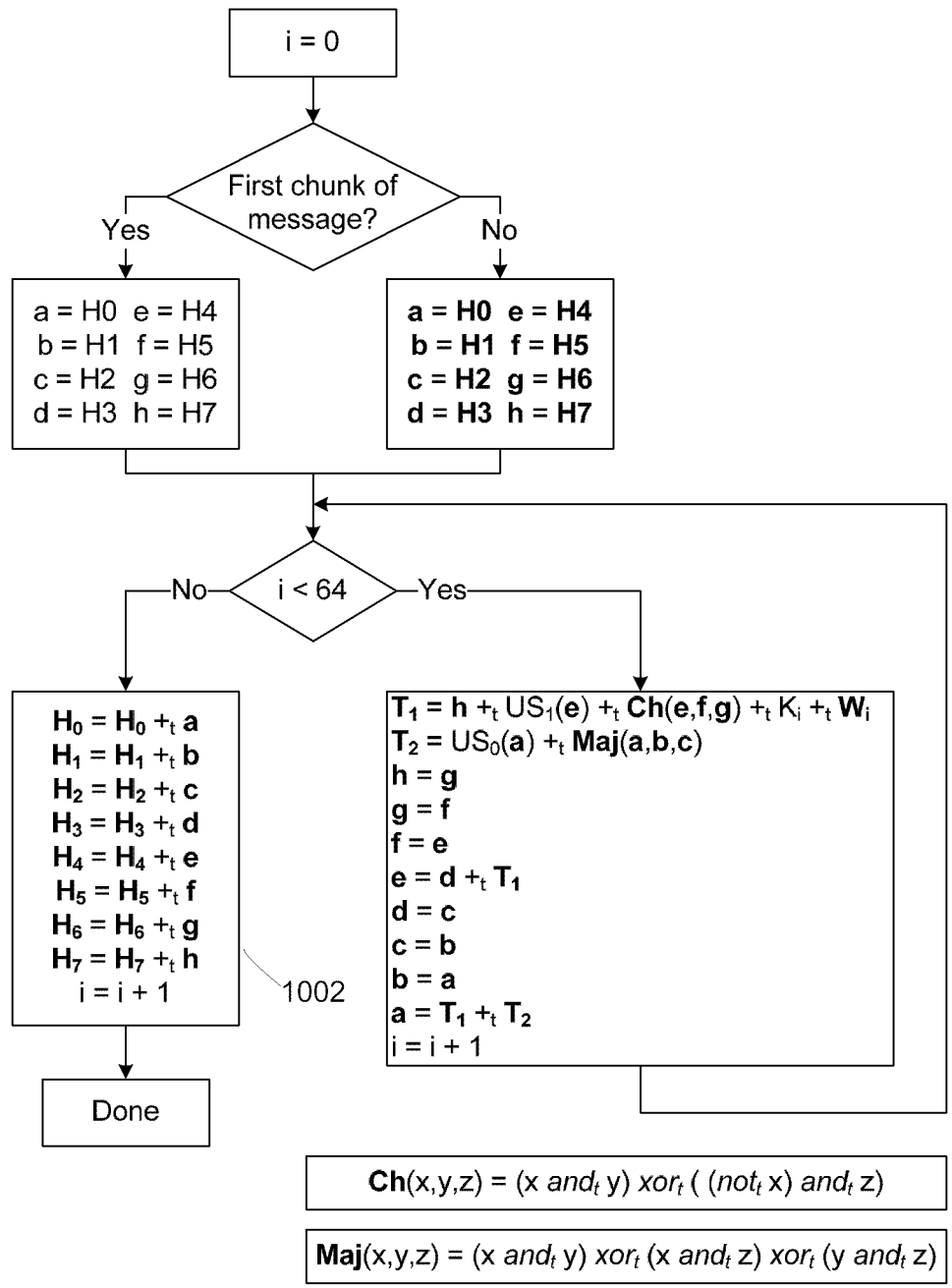
FIG. 10 is a flowchart depicting secured SHA 256 implementation to process the $H_i$ array according to an embodiment.

The compression function shown in FIG. 10 is executed to complete the hashing of a single chunk of data. For each $m_i$ in M, the current hash values H are copied into temporary processing values (a through h), which are mapped as shown in FIG. 10. All operations (addition, and, xor, and not) act on encoded values or one encoded and one un-encoded value, producing encoded values. The $W_i$ value may be an un-encoded value if $W_i$ is a padding word (this can only be true for $0 \leq i < 16$). The $US_n$ tables are similar to the $LS_n$ tables above. They are table implementations of the E operations and break down into four sub-applications of the $\Sigma$ function on the constituent bytes of the word in the same way as the $\sigma$ operations. There are no SUS tables corresponding to the SLS tables in the message expansion steps as the a and e values in the algorithm are always encoded values. Once each of the 64 $W_i$ values have been processed, the values a through h are added to the existing values of $H_0$ through $H_7$ (step 1002), respectively, using an encoded addition yielding a transformation $T_H$ on the H values.

The first four rounds of the very first message chunk can be treated specially in order to better protect the encoding scheme on the $H_n$ and a . . . h values. The internal transform $T_H$ can be converted to the external digest transform $T_d$ for each word $H_n$ and concatenated together to form the output digest. In the first four rounds of the initial 512-bits of message, some or all of the state variables a through h hold values fixed by the algorithm. This allows for the use of a "special case" above for the first four rounds of the first chunk of message:

1. In the first round, only value $T_1$ holds an unknown value. $T_1$ is computed through the addition of a pre-computed constant value and $W_0$. Thus at the end of round 1, all variables except e and a hold known, fixed values and should not be encoded.
2. In round 2, both $T_1$ and $T_2$ contain unknown values, and b, c, d, f, g, and h are all known, fixed values.
3. In round 3; c, d, g and h are known, fixed values.
4. In round 4; only d and h are known, fixed values.
5. In all remaining rounds of the first chunk, and in all subsequent chunks, all 8 intermediate state values are mixed with message bits and are considered "unknown".

By using these special cases, one can initially consider all 8 state variables to be "un-encoded" and initialized with the original, un-encoded, H values. In each of the first four rounds of the first message chunk, two state variables transition from "un-encoded" to "encoded" as data is mixed into the a and e values through the encoded addition of $T_1$. Each subsequent round considers the values of these variables to be encoded when using them in operations. This helps to ensure that the attacker cannot predict the contents of the state variables in the first four rounds and use this to attack the transformation on the state variables. For best protection the encoded message M should have at least four words of data to ensure encoded data is mixed in to $T_1$ at each step. Such a weakness for short messages is often not significant as extremely short messages may be easily brute-forced.

The primary goal of the present implementation is to prevent an attacker from determining the un-encoded message or digest by observing the inputs, outputs, and intermediate internal state of the algorithm. In the case where both the input message and the digest are encoded, the following properties of the implementation can be observed:

1. All words in the W array are either encoded message words, words consisting of one or more encoded message bytes followed by one or more encoded padding bytes, or are un-encoded padding words. No word in W contains un-encoded message bytes.
2. No padding bytes are encoded except the values 0x80 and 0x00, which are encoded with $T_{IM}$. This transformation is distinct from the external message transform $T_M$ and should be chosen such that exposing two known values does not easily allow the attacker to determine other values. For example, a function mapping arbitrary bytes to arbitrary bytes (e.g. a 256-byte lookup table) has this property. Only the mappings for 0x80 and 0x00 need be exposed in this "table", the full mapping is not required.
3. Any $T_W$-encoded W word derived from encoded padding data involves at least one byte of encoded message data.
4. All operations taking W words as input output encoded data.
5. All operations computing state variables a through h either involve un-encoded inputs, in which case they remain un-encoded, or involve at least one encoded input, in which case the output is encoded.
6. After round 4 of the first message chunk, all state variables a, . . . h are encoded.
7. After processing the first message chunk, values $H_0$ through $H_7$ are all encoded.
8. No known value (initial values for $H_0$ through $H_7$, K values are encoded with the same encoding used to hold unknown data.
9. The outputs of σ operations involving un-encoded padding data (SLS tables) and outputs of σ operations for encoded data (LS tables) use distinct encodings. The addition operations using these values are distinct.

Due to the above, input message bytes are never revealed during message expansion nor during hash processing. They are encoded with encoding schemes that are never used to encode known, fixed data such as algorithmic constants or padding values. This ensures that message values are never exposed in un-encoded form and also that known plaintext style attacks are frustrated because all padding and fixed values are un-encoded or differently encoded from message and state data. Certain embodiments of the present disclosure can employ additional protection features. For example, control flow transformation can be applied to the algorithm to further obfuscate the algorithm.

The approach to handling padding bytes as un-encoded values can be extended to allow arbitrary parts of the message M to be passed un-encoded. Keeping padding values un-encoded is desirable from a security perspective as it prevents some known plaintext style attacks on the message transformation. For applications that involve messages that have partially known (or easily guessed) values such as structured documents or formatted data, it is desirable to allow only the portions of the message that are sensitive to be encoded, and allow the remainder of the message data to be un-encoded. An example of this is computing the hash of a cryptographic key embedded inside a data structure with a known or easily guessed format (e.g. an ASN1 encoded RSA key). The above scheme easily extends to allow transition between encoded and un-encoded values at any word boundary, with the appropriate metadata maintained to indicate where transitions occur within the stream. The padding mechanism also may be useful in keyed cryptographic hash functions, such as Message Authentication Codes (MAC).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored on a machine-readable medium or media (also referred to as a computer-readable media, processor-readable media, or computer usable media having computer-readable program code embodied therein). The machine-readable media can be any suitable tangible, non-transitory media, including magnetic, optical, or electrical storage media including a diskette, compact disk read only memory (CD-ROM), memory device (volatile or non-volatile), or similar storage mechanism. The machine-readable media can contain various sets of instructions, code sequences, configuration information, or other data, which, when executed, cause a processor to perform steps in a method according to an embodiment of the disclosure.

Those of ordinary skill in the art will appreciate that other instructions and operations necessary to implement the described implementations can also be stored on the machine-readable media. The instructions stored on the machine-readable media can be executed by a processor or other suitable processing device, and can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A computer-implemented method of protecting execution of a cryptographic hash function in a computing environment where during execution inputs, outputs and intermediate values of the cryptographic hash function can be observed, the method comprising:
   providing a transformed cryptographic hash function wherein the transformed cryptographic hash function implements the cryptographic hash function in a transformed domain;
   encoding an input message to provide an encoded input message in the transformed domain; and
   generating an output digest by executing the transformed cryptographic hash in the transformed domain with the encoded input message as an input to the transformed cryptographic hash function.

2. The method of claim 1,
   wherein the output digest is encoded.

3. The method of claim 1, wherein the input message is received in an encoded first form, and the step of encoding the input message further comprises re-coding the input message in a second form wherein the second form is in the transformed domain.

4. The method of claim 1, wherein the cryptographic hash function is SHA-1, SHA-224, SHA-256, SHA-384, or SHA-512.

5. The method of claim 4, further comprising:
   padding the encoded input message with un-encoded padding bytes to provide a padded message.

6. The method of claim 5, further comprising:
   dividing the padded message to provide at least one array of encoded words and un-encoded padding words.

7. The method of claim 6, wherein executing the transformed cryptographic hash function comprises:
   processing each of the at least one array according to the transformed secure hash function such that intermediate values of the transformed cryptographic hash function containing any portion of the input message are always encoded.

8. The method of claim 7, wherein processing each of the at least one array comprises: initializing initial state variables and constants to be used in one or more transformed cryptographic hash function iterations;
   performing transformed cryptographic hash function iterations on each of the at least one array to provide updated state variables;
   applying an output encoding to the updated state variables to provide encoded state variables; and
   concatenating the encoded state variables to provide the output digest.

9. The method of claim 8, wherein performing transformed cryptographic hash function iterations on each of the at least one array comprises:
   determining mappings of the component cryptographic functions used in the cryptographic hash function in the transformed domain.

10. The method of claim 9, wherein the mappings are stored in look-up tables.

11. The method of claim 9, wherein the mappings are used to expand the number of words in the at least one array.

12. The method of claim 9, wherein the mappings are used to provide intermediate values of the state variables.

13. Non-transitory computer-readable media containing instructions, which when executed by a processor cause the processor to perform a method of protecting execution of a cryptographic hash function in a computing environment where during execution inputs, outputs and intermediate values can be observed, the method comprising:
   executing a transformed cryptographic hash function wherein the transformed cryptographic hash function implements the cryptographic hash function in a transformed domain by:
     encoding an input message to provide an encoded input message in the transformed domain; and
     generating an output digest by executing the transformed cryptographic hash in the transformed domain with the encoded input message as an input to the transformed cryptographic hash function.

14. The computer-readable media of claim 13,
   wherein the output digest is encoded.

15. The computer-readable media of claim 13, wherein the input message is received in an encoded first form, and the step of encoding the input message further comprises re-coding the input message in a second form wherein the second form is in the transformed domain.

16. The computer-readable media of claim 13, wherein the cryptographic hash function is SHA-1, SHA-224, SHA-256, SHA-384, or SHA-512.

17. The computer-readable media of claim 13 further comprising:
   padding the encoded input message with un-encoded padding bytes to provide a padded message.

18. The computer-readable media of claim 17, further comprising:
   dividing the padded message to provide at least one array of encoded words and un-encoded padding words.

19. The computer-readable media of claim 18, wherein executing the transformed cryptographic hash function comprises:
   processing each of the at least one array according to the transformed secure hash function such that intermediate values of the transformed cryptographic has function containing any portion of the input message are always encoded.

20. The computer-readable media of claim 19, wherein processing each of the at least one array comprises:
   initializing initial state variables and constants to be used in one or more transformed cryptographic hash function iterations;
   performing transformed cryptographic hash function iterations on each of the at least one array to provide updated state variables;
   applying an output encoding to the updated state variables to provide encoded state variables; and
   concatenating the encoded state variables to provide the output digest.

21. The computer-readable media of claim 20, wherein performing transformed cryptographic hash function iterations on each of the at least one array comprises:

determining mappings of the component cryptographic functions used in the cryptographic hash function in the transformed domain.

22. The computer-readable media of claim 21, wherein the mappings are stored in look-up tables.

23. The computer-readable media of claim 21, wherein the mappings are used to expand the number of words in the at least one array.

24. The computer-readable media of claim 21, wherein the mappings are used to provide intermediate values of the state variables.

25. A computer-implemented method of protecting the derivation of an encryption key for Digital Rights Management (DRM) content using a cryptographic hash function, the method comprising:
  providing a transformed cryptographic hash function wherein the transformed cryptographic hash function implements the cryptographic hash function in a transformed domain,
  encoding an input message to provide an encoded input message in the transformed domain; and
  generating the encryption key by executing the transformed cryptographic hash in the transformed domain with the encoded input message as an input to the transformed cryptographic hash function; and
  encoding the encryption key.

* * * * *